United States Patent [19]

Botzolakis et al.

[11] Patent Number: 4,864,876

[45] Date of Patent: Sep. 12, 1989

[54] INSTRUMENTATION OF A DOSING-DISC CAPSULE MACHINE

[75] Inventors: John E. Botzolakis, Randolph, N.J.; Dirk Casier, Stroudsburg, Pa.; Michael R. Harris, Hackettstown, N.J.

[73] Assignee: Warner-Lambert Company, Morris Plains, N.J.

[21] Appl. No.: 202,155

[22] Filed: Jun. 2, 1988

[51] Int. Cl.$^4$ .................................... G01L 5/00

[52] U.S. Cl. .................................... 73/862.54; 141/94

[58] Field of Search .................... 73/862.54, 865.9; 141/94

[56] References Cited

U.S. PATENT DOCUMENTS

| | | | |
|---|---|---|---|
| 2,720,109 | 10/1955 | Stirn et al. | 73/32 R |
| 2,953,959 | 9/1960 | Weinert | 141/73 X |
| 3,357,155 | 12/1967 | Carruthers | 53/517 X |
| 4,116,247 | 9/1978 | Zanasi | 73/864.44 X |
| 4,432,246 | 2/1984 | Granat | 73/862.54 X |
| 4,501,307 | 2/1985 | Moser et al. | 53/560 X |
| 4,513,796 | 4/1985 | Miller et al. | 141/94 X |
| 4,542,835 | 9/1985 | Gamserini | 222/1 |
| 4,693,285 | 9/1987 | Cheng | 141/94 X |

*Primary Examiner*—Tom Noland
*Attorney, Agent, or Firm*—Howard Olevsky; Daniel A. Scola; Ronald A. Daignault

[57] ABSTRACT

A dosing disc capsule machine has a tamping pin carried in a mounting block for extending into openings in a dosing disc to compact powder in the openings to form a plug. The plug is then transferred into a capsule body by an ejection pin. In accordance with the invention, a load cell is positioned above the tamping pin in the mounting block for measuring the compressive force exerted on the powder by the tamping pin. The load cell occupies the space normally occupied by the overload spring in such dosing disc capsule machines. Thus, modification of the tamping pin is not necessary, and the simple substitution of parts makes it possible to interchange the instrumentation from one machine to another. Further, the modifications are minor and do not affect the normal operation of the machine.

10 Claims, 4 Drawing Sheets

INSTRUMENTATION OF A DOSING-DISC CAPSULE MACHINE

FIELD OF THE INVENTION

This invention relates to capsule filling machines. More specifically, the invention relates to dosing-disc capsule machines for filling hard gelatin capsules with a powdered pharmaceutical mixture.

PRIOR ART

In the manufacture of pharmaceutical preparations, and especially hard gelatin capsules, various machines are known in the prior art for loading or filling the powdered pharmaceutical material into the capsule bodies. An example of one such machine is disclosed in U.S. Pat. No. 4,501,307. In this machine, the powder is located in a filling product container, the base of which comprises a rotating dispensing disc. The dispensing disc has a plurality of openings into which the powder is progressively introduced and compressed with spring loaded tamping pins as the disc rotates beneath the tamping pins. After a compressed mass or plug of powder has been formed, it is ejected with an ejection pin into the capsule body.

Another prior art machine incorporates strain gauges in association with the tamping pins so that the amount of compression can be measured. This machine modifies the tamping pins to provide a flat surface for mounting the strain gauges. This requires the modification of numerous pins for each capsule size and makes the pins unsuitable for use in conventional or normal machine operation without the instrumentation. Such pins also cannot be readily interchanged from one machine to another. This apparatus is disclosed by K. Shah, et. al., in *Pharmaceutical Technology,* 7(4), 1983.

Other machines which disclose means for regulating or controlling the amount, weight, density, etc. of materials compacted into plugs or cohesive masses are described in U.S. Pat. Nos. 2,720,109, 2,953,959, 3,357,155 4,116,247 and 4,542,835.

U.S. Pat. No. 3,357,155 teaches a means for packing a food product into discrete masses to that the masses will have an equal weight of product therein. This is achieved by using spring loaded plungers in which relatively long springs are used much in the nature of an "overload clutch". In other words, when a predetermined amount of compression of the product has been reached, the spring will yield. There is no means, however, for measuring the amount of compression, nor does this machine relate to a capsule dosing machine and the unique problems associated therewith.

U.S. Pat. No. 2,720,109 discloses a method for determining powder density in pharmaceutical preparations, wherein the weight of a known volume is measured and then by calculation the density is determined. Again, this patent does not disclose any means for measuring the degree of compressive force being applied to the powder.

U.S. Pat. No. 2,953,959 discloses a filling machine for compacting powder for use in explosive devices, in which a given volume of powder is subjected to a predetermined set pressure. There is no means for measuring the amount of compacting pressure being applied to the powder.

U.S. Pat. Nos. 4,116,247 and 4,542,835 both relate to apparatus and/or methods for filling capsules with metered quantities of powder. Both of these patents disclose means for assuring that no air is entrained in the compacting tube at the beginning of a compression cycle. U.S. Pat. No. 4,116,247 appears to be particularly directed to a unique magnetic mounting means for the tamping pin.

In the manufacture of hard gelatin capsules, it would be desireable to be able to screen and select different formulations and also to evaluate different excipients to be employed in the capsules for optimum results. Moreover, the ability to study the effect of various processing parameters on the in-vitro performance of the product, including the effect of tamping force on fill weight, and the interrelationship of compression force, plug hardness and drug dissolution would be helpful in producing optimum results. By monitoring the ejection force exerted on the compacted plug, the formulators would be enabled to optimize the amount of lubricating excipients used, which would have an effect on ultimate drug dissolution. Further, it would be desireable to have the ability to carefully monitor quality and to achieve reproducibility in making a consistent product each time.

None of the prior art devices discussed herein possess a simple and effective means for achieving the desireable results set forth above.

SUMMARY OF THE INVENTION

Accordingly, the present invention is directed to a machine for filling hard gelatin capsules with a plug or body of compressed powder, in which means is provided for measuring the compressive force applied to the powder, enabling the effect of various processing parameters to be accurately measured and controlled. More specifically, the present invention is directed to an improvement for dosing-disc capsule machines in which tamping pins are used to fill and compress a pharmaceutical powder in the openings in a dosing disc and the compressed plug is then transferred into a capsule body, with load cells associated with the pins to measure the compressive force applied to the powder.

In conventional dosing-disc capsule machines, springs are-positioned above the heads of the pins in the pin mounting block. A typical dosing disc contains five sets of cavities for compressing the powder and one set for ejecting the compressed plug into the capsule body. The disc rotates underneath the powder bed chamber and the powder is progressively tamped at the five stations to form the plug. The tamping pins move up and down in an intermittent manner at the stations while the disc is indexed in a circular path past the stations to form a plug. Starting at station one, the powder fills the cavity in the disc and is tamped or compressed with the pin(s) at that station. The disc is then rotated to station two, while more powder enters the cavity left by tamping the powder at station one. At station two, the tamping pin(s) is again lowered into the cavity to again compress the powder. Thereafter, the disc is rotated through stations three, four and five, with sequential compression of the powder being effected with the tamping pins at those stations. An ejection pin then engages the compressed plug and ejects it into a capsule body positioned beneath the dosing disc. The number of pins per station varies from one for a research machine, for example, up to 24 for large production machines.

In the present invention, the overload spring positioned above the head of the pin is replaced with a load cell and spacer, or a shortened spring is provided and the load cell used with the spring. The load cell is of sufficiently small size that it can simply be placed in the space normally occupied by the spring. Neither the tamping pin holder nor the tamping pin needs to be further modified. The ejection pin holder, which normally does not include a spring, must be drilled out above the ejection pin head. A spacer and load cell are then placed in the holder directly above the head of the ejection pin and held in place by a keeper plate mounted on top of the holder small openings are formed in the holders for access of wires to the load cells. Signals from the load cells are processed through a conditioner-/amplifier and analyzed via a computerized data acquisition system. This approach may be applied to any size capsule machine, and enables accurate measurement of powder compaction and control of the various parameters used in capsule production. Accordingly, screening and selection of hard gelatin capsule formulations is readily obtained. Also, the evaluation of different excipients employed in hard gelatin capsules may be easily accomplished. The effect of various processing parameters on the in-vitro performance of the product, such as the effect of tamping force on fill weight and the interrelationship of compression force, plug hardness, and drug dissolution may also be studied and adjusted as desired or necessary. The ability to monitor ejection forces also enables the amount of lubricating excipients to be optimized, viz-a-viz their effect on drug dissolution. Moreover, in a production environment the invention can serve as a quality control tool, making the reproducibility of a consistent product much easier to obtain.

BRIEF DESCRIPTION OF THE DRAWINGS

These and other objects and advantages of the invention will become apparent from the following detailed description when considered with the accompanying drawings, in which like reference characters designate like parts throughout the several views, and wherein.

DETAILED DESCRIPTION OF THE PREFERRED EMBODIMENTS

Figure 1:
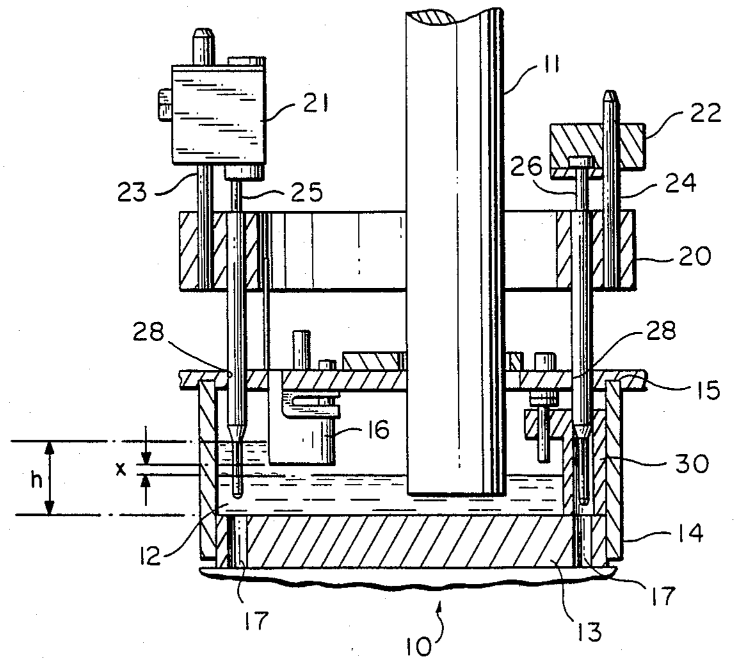
FIG. 1 is an enlarged, somewhat schematic vertical sectional view of a dosing-disc capsule machine of the type with which the present invention is used.

Referring more specifically to the drawings, a dosing-disc capsule machine in accordance with the invention is indicated generally at 10 in FIG. 1. The machine comprises a substantially centrally disposed fill channel or container discharge tube 11 for conveying powder from a powder hopper (not shown) into a powder bed or dosing chamber 12. The bottom of the chamber is closed by a rotatable dosing disc 13, and is enclosed at its sides by a dosing chamber ring 14. A cover plate 15 closes the top of the chamber. Powder is filled into the chamber to a maximum height or depth, in one example, of about 40 mm, and a proximity level sensor 16 carried by the cover is set for a distance "x" of from about 2 mm up to about 8 mm. The dosing disc has a plurality of holes or pockets 17 formed in the top surface thereof for receiving a quantity of powder from the chamber as the disc rotates beneath the chamber.

A guide ring 20 is positioned above the chamber, and a plurality of tamping pin mounting blocks 21 and ejection or transfer mounting blocks 22 are supported on the ring by posts 23 and 24, respectively. Tamping pins 25 are carried by mounting blocks 21 for vertical movement toward and away from the chamber, and at least one ejection pin 26 is carried by at least one mounting block 22 for vertical movement toward and away from the chamber.

The tamping pins 25 and ejection pin 26 extend through openings 28 in the cover 15 and into aligned relationship with the openings or pockets 17 in the dosing disc. In addition, an adjustable wiper unit 30 is supported beneath the cover in alignment with the ejection pin to wipe powder off the ejection pin.

Figure 3:
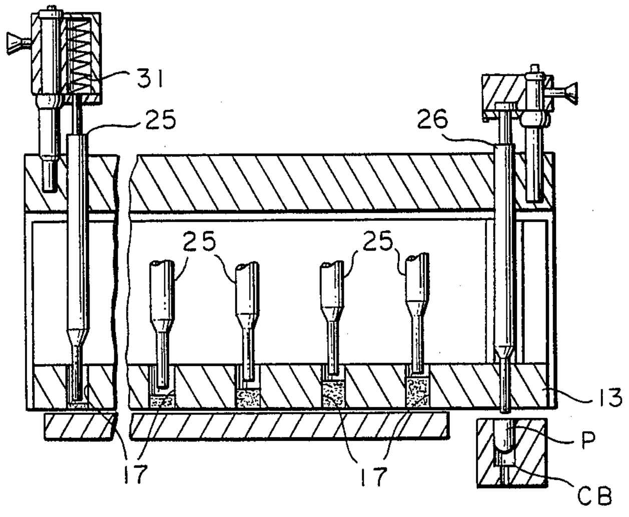
FIG. 3 PRIOR ART
FIG. 3 is an enlarged, schematic, developed or projected side view of the machine of FIG. 2, showing a prior art arrangement in which overload springs are associated with the tamping pins.
Figure 5:
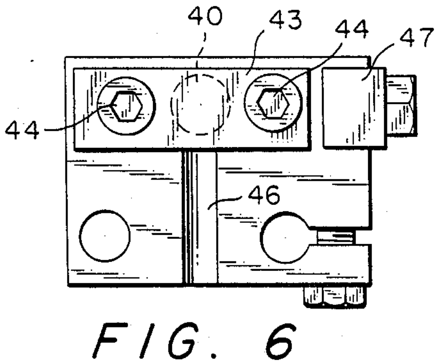
FIG. 5 is a top plan view of the modified holder in accordance with the invention.
Figure 6:
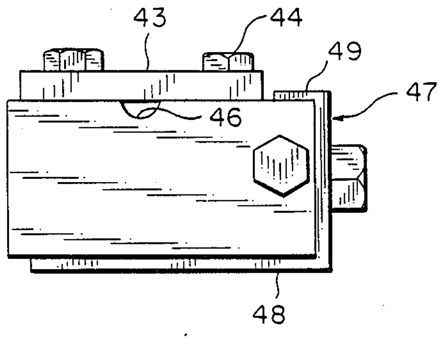
FIG. 6 is a side view in elevation of the modified holder of FIG. 5.
Figure 8:
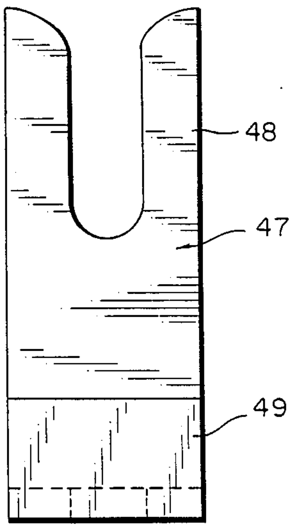
FIG. 8 is a top plan view of the keeper or sealing plate used with the modified holder.

Further, as seen best in FIG. 3, which depicts a prior art device, an overload spring 31 is positioned in the mounting block directly above the head of the tamping pin 25. The ejection pin 26, on the other hand, is rigidly mounted in its mounting block.

Figure 2:
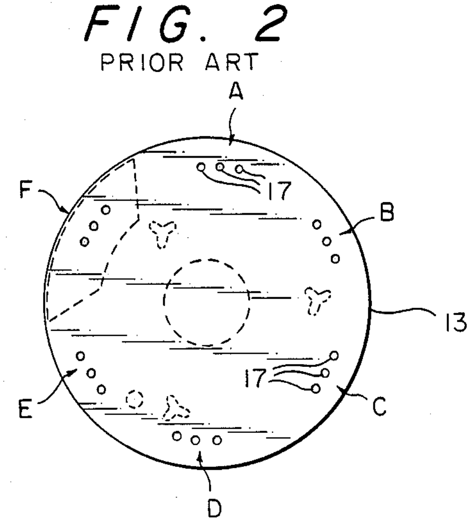
FIG. 2 PRIOR ART
FIG. 2 is a somewhat schematic top plan view showing the five stations in a typical machine.

As indicated somewhat schematically in FIGS. 2 and 3, in one example of the invention there are five stations "A", "B", "C", "D" and "E", each containing three tamping pins 25 and associated openings or pockets 17 in the dosing disc. Powder is permitted to fill the pocket(s) at the first station and the tamping pins are then lowered to compact the powder in the pocket(s). The disc is then indexed to the next station, during which powder in the chamber fills the void or space left in opening or pocket 17 by compaction of the powder at station "A". The tamping pins are again lowered to compact the powder in the opening 17 at station "B". This sequence is repeated up to station "E", whereupon the ejection pin 26 engages the plug "P" of compacted powder and transfers it into a capsule body "CB" positioned beneath the dosing disc.

All of the structure and function described above is essentially conventional. However, as shown more specifically in FIGS. 1 and 4–8, the mounting blocks for the tamping pins and ejection pin are modified in accordance with the present invention to provide a means for measuring the amount of compaction of the powder in the pockets or openings 17. This means comprises a load cell 40 positioned in the mounting block directly above the head of the respective pin.

Figure 4:
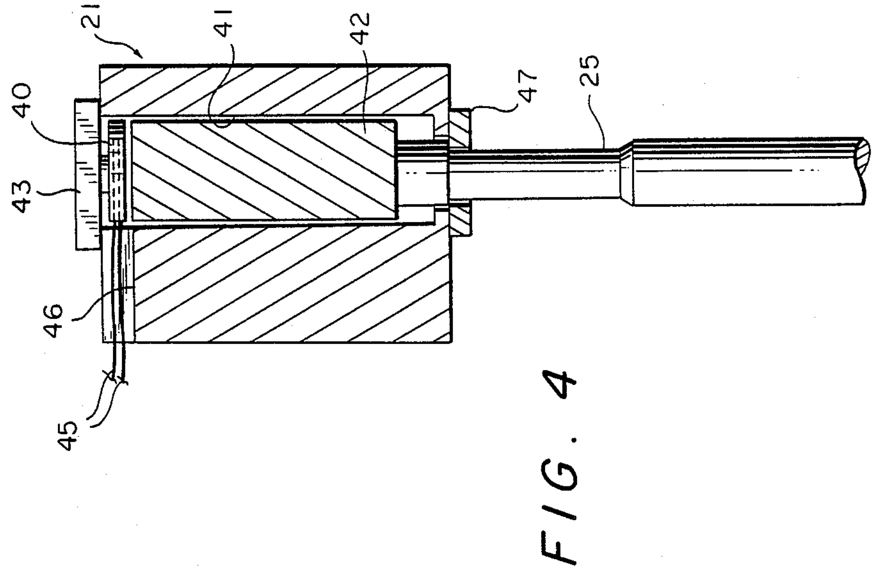
FIG. 4 is a further enlarged vertical sectional view of a tamping pin and its holder in which a spacer and load cell are substituted for the spring above the pin in accordance with the invention.
Figure 7:
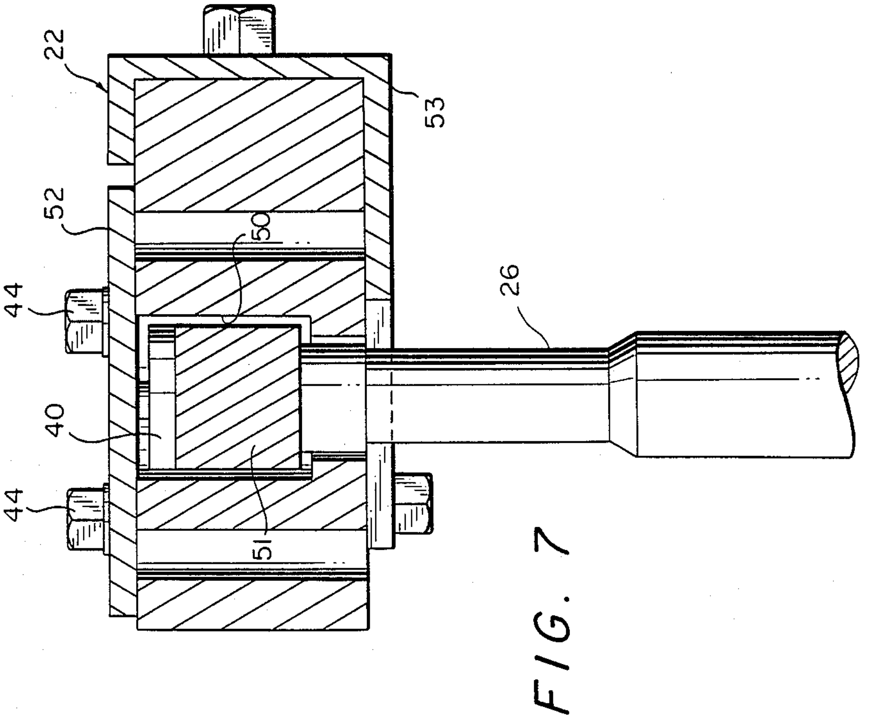
FIG. 7 is an enlarged vertical sectional view of the modified holder and ejection pin incorporating a load cell and spacer in accordance with the invention.

Thus, with reference to FIG. 4, spring 31 (see FIG. 3) has been removed from the space 41 in the load cell and a spacer 42 and load cell 40 have been substituted in its place. The spacer positions the load cell so that it just contacts a keeper plate 43 secured over the top of the load cell by fasteners 44. Accordingly, when the tamping pin 25 is lowered to compact the powder in opening 17, the load cell produces a signal representative of the compressive force applied. Wires 45 lead from the load cell through a channel 46 formed in the top of the mounting block and to suitable equipment (not shown) which may include an amplifier for amplifying the signal, a recorder for recording the results, and a computer for performing analytical functions. If desired, a shorter spring (not shown) may be used with the load cell, with or without a spacer.

A tamping pin retaining plate 47 is secured to the mounting block and includes a bifurcated portion 48 extending beneath the mounting block and under the head on the tamping pin to retain the tamping pin in the opening 41. A short, horizontal flange 49 extends over the top of the mounting block to firmly anchor the retaining plate.

The mounting block 22 for the ejection pin 26 requires slight modification, in that a bore or opening 50 must be drilled in the block to accommodate a spacer 51 and load cell 40. A keeper plate 52 is secured over the top of the mounting block to retain the load cell in place, and an ejection pin retaining plate 53 such as that previously described is also secured to the block for retaining the ejection pin in its opening 50.

The load cells 40 are of sufficiently small size (typically one-half inch in diameter) that they may be accommodated within the space provided for the overload spring 31. The load cells also preferably have a capacity of 250 lbs. to provide enough sensitivity for measurement of the low forces encountered.

Figure 9:
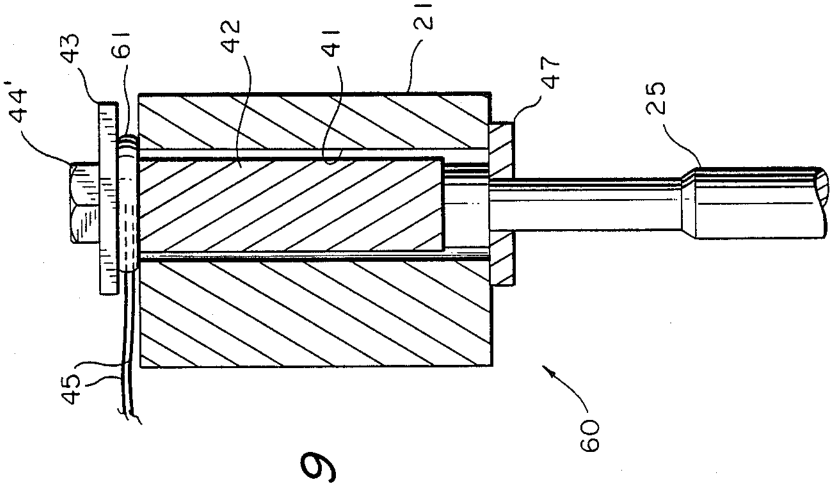
FIG. 9 is a fragmentary vertical sectional view of a modified arrangement, in which the load cell is positioned outside the opening in the mounting block.

A first modification of the invention is indicated generally at 60 in FIG. 9. In this form of the invention, a somewhat larger load cell 61 is used. This load cell is situated outside the opening 41 in the tamping pin mounting block 21 (and similarly, outside opening 50 in the ejection pin mounting block 22), and longer fasteners 44' are used to secure the keeper plate 43 (or, in the case of the ejection pin, keeper plate 52) over the load cell. In all other respects this form of the invention is the same as previously described.

Figure 10:
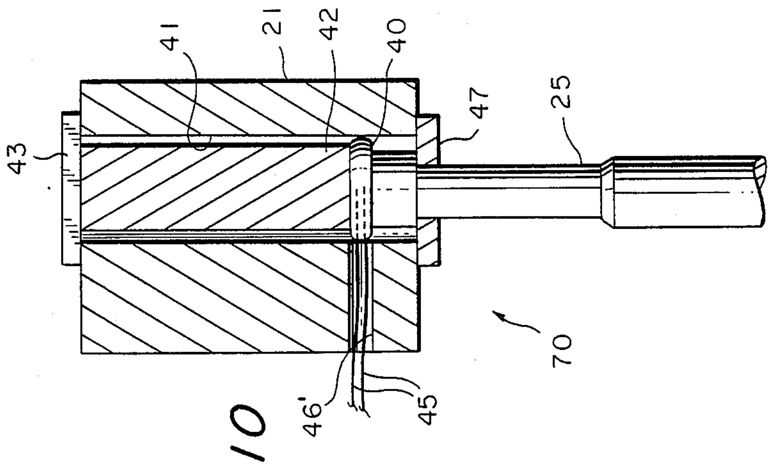
FIG. 10 is a fragmentary vertical sectional view of a further modified arrangement, in which the load cell is positioned between the head of the pin and the spacer.

A second modification is indicated generally at 70 in FIG. 10. In this form of the invention, the load cell 40 is positioned between the head of the respective tamping or ejection pin and its associated spacer or spring. In the example shown, the load cell is directly engaged with the head of the tamping pin 25 and spacer 42 is disposed above the load cell. Passageway 46' extends through the side of the mounting block for access of the wires 45 to the load cell. In all other respects, this form of the invention is the same as that previously described. It should be noted that similar modifications may be made to the ejection pin arrangement.

It should also be noted that load cells may be incorporated into the spacers. In other words, a load cell could be adhesively secured to a spacer so that a unitary structure is provided, enabling inventory and handling of fewer parts, for example. Moreover, different types and configurations of load cells may be used.

The invention thus provides simple and reliable instrumentation which requires only a one-time modification. The modification is minor and does not affect the normal operation of the machine. The mounting blocks can be used with or without the instrumentation. The instrumentation may be used with any capsule size pins, and they can be interchanged from one machine to another.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

We claim:

1. In a dosing disc capsule machine having a dosing disc chamber with a rotatable dosing disc at a bottom thereof, said dosing disc having openings therein for receiving powder from the chamber for compaction of the powder into a plug, at least one tamping pin having one end thereof secured in an opening in a tamping pin mounting block for movement of the pin into the opening in the dosing disc to compact the powder therein, and an ejection pin for transfer of the plug into a capsule body, the improvement comprising:

a load cell positioned in operative association with at least one of the tamping pin and ejection pin for measuring the compressive force applied by the pin on the powder being contacted by that pin.

2. A dosing disc capsule machine as claimed in claim 1, wherein the mounting block is of a type which comprises a space designed for housing an overload spring, the improvement further comprising:

the load cell being associated with the tamping pin and occupying the space in the mounting block normally occupied by the overload spring.

3. A dosing disc capsule machine as claimed in claim 2, wherein:

a spacer is engaged with said load cell to position the load cell against a load cell keeper secured on top of said mounting block so that the compressive force exerted by said tamping pin can be measured.

4. A dosing disc capsule machine as claimed in claim 3, wherein:

the ejection pin is carried in a mounting block having an opening formed therein for receiving an end of the ejection pin; and a load cell is positioned in said opening above the ejection pin for measuring the force exerted by the ejection pin in transferring the plug of compressed powder to a capsule body.

5. A dosing disc capsule machine as claimed in claim 2, wherein:

the load cell is engaged directly against said one end of the tamping pin; and a passageway is formed through the mounting block for access to wires leading from the load cell.

6. A dosing disc capsule machine as claimed in claim 1, wherein:

the ejection pin is carried in a mounting block having an opening formed therein for receiving an end of the ejection pin; and a load cell is positioned in said opening above the ejection pin for measuring the force exerted by the ejection pin in transferring the plug of compressed powder to a capsule body.

7. A dosing disc capsule machine as claimed in claim 6, wherein:

there are a plurality of tamping pins and associated mounting blocks for progressively compacting the powder in the openings in the dosing disc prior to transfer of the compacted powder to a capsule body.

8. A dosing disc capsule machine as claimed in claim 7, wherein:

the tamping pins have a diametrically enlarged head on the end received in the opening in the mounting block; and a tamping pin retainer is secured to said mounting block and includes a portion extending below said mounting block into engagement beneath the head on the tamping pin to prevent the tamping pin from dropping out of said opening in the mounting block.

9. A dosing disc capsule machine as claimed in claim 8, wherein:

a channel is formed in the top of the mounting block for receiving at least one wire connected with the load cell to conduct signals produced by the load cell to equipment for utilizing the signals.

10. A dosing disc capsule machine as claimed in claim 1, wherein:

the load cell is positioned outside the mounting block in aligned relationship with said pin; and a keeper plate is secured to said mounting block to retain the load cell in position.

* * * * *